United States Patent [19]

Siempelkamp et al.

[11] 4,432,828
[45] Feb. 21, 1984

[54] METHOD OF AN APPARATUS FOR MOUNTING A FOIL ON A PLATE

[75] Inventors: Dieter Siempelkamp, Krefeld; Wolfgang Götz, Krefeld-Fischeln, both of Fed. Rep. of Germany

[73] Assignee: G. Siempelkamp GmbH & Co., Krefeld, Fed. Rep. of Germany

[21] Appl. No.: 177,839

[22] Filed: Aug. 14, 1980

[30] Foreign Application Priority Data

Aug. 14, 1979 [DE] Fed. Rep. of Germany ....... 2932845

[51] Int. Cl.³ .............................................. B32B 31/04
[52] U.S. Cl. ................................... 156/285; 156/286; 156/382; 156/538; 156/556
[58] Field of Search ............... 156/285, 286, 382, 538, 156/556

[56] References Cited

U.S. PATENT DOCUMENTS

| | | | |
|---|---|---|---|
| 3,704,883 | 12/1972 | Don | 156/556 |
| 4,035,221 | 7/1977 | Pagnoni | 156/538 |
| 4,059,470 | 11/1977 | Primsuesi et al. | 156/285 |
| 4,488,256 | 2/1980 | Schwab | 156/538 |

FOREIGN PATENT DOCUMENTS 7501383 8/1976 Netherlands ........................ 156/285

*Primary Examiner*—Caleb Weston
*Attorney, Agent, or Firm*—Karl F. Ross; Herbert Dubno

[57] ABSTRACT

An apparatus for applying, without folds or trapped air pockets, a metal foil to an underlying plate of board comprises a pair of parallel elongate suction wedges juxtaposable to the plate and reciprocatable parallel thereto a vertically reciprocatable bar for clamping the foil to the plate along a line extending between the suction wedges and parallel thereto. The wedges are each provided with a multiplicity of apertures in a linear array along the vertex of the wedge and a textile web extending from the respective wedge parallel to the plate for supporting the foil during a withdrawal stroke of the wedge.

8 Claims, 4 Drawing Figures

METHOD OF AN APPARATUS FOR MOUNTING A FOIL ON A PLATE

FIELD OF THE INVENTION

Our present invention relates to the production of laminations. More particularly, our present invention relates to a method of and an apparatus for forming a stack of lamination layers including at least one foil section, prior to compression by a press.

BACKGROUND OF THE INVENTION

In the production of printed-circuit boards a thin metal foil is juxtaposed to a board or plate impregnated with a synthetic resin, the two layers subsequently being heated and pressed together. Generally, a plurality of laminations each including at least one base board and at least one metal foil are interleaved with pressure plates prior to a single compression operation.

The foil sections, the base boards and the pressure plates are stacked in a predetermined order at a stacking station which includes a vertically shiftable support table, conveyance devices for depositing the plates and the boards on the table and a tensioning device for stretching each metal-foil section out over an underlying plate or board and subsequently depositing the section thereonto. The conveyance devices and the tensioning device operate in alternating phases of a stacking cycle. The support table is frequently the lower platen of a press.

The resin-impregnated base boards or carrier mats are generally fabricated from glass or paper fibers and a resin such as a phenolic.

Assemblies are known, such as German patent document (Deutsche Patentschrift) DE-PS No. 2,209,691, for forming a stack of fiber boards and heat-treated veneers or foils which are then pressed together to form wall paneling. The conveyance device for depositing the fiber boards on the support table comprises a pair of tongs for gripping opposite ends of each board and bending the same in a downwardly convex curve, whereby a central linear portion of the board makes contact with the underlying surface along a line. The tongs or grippers are then opened or spread apart, whereupon the uplifted lateral portions of the board flap down onto the respective underlying surfaces and engage the same in a center-to-outer-edge wave-type motion which forces air from the space between upper and lower lamination layers. As described in German patent document DE-PS No. 2,209,691, the tongs or grippers of the conveyance device may be provided with actuators.

Stacking assemblies of the above-mentioned type are unsuited for depositing a thin foil onto an underlying plate or lamination layer. Frequently the foil has folds or crimps upon placement and pockets of air are trapped between the foil and the plate. Such folds and air pockets are largely unacceptable in printed-circuit boards.

OBJECTS OF THE INVENTION

An object of our present invention is to provide an improved method for applying a foil to a plate or board.

Another object of our present invention is to provide an apparatus of the above-described type for implementing such a method.

A more particular object of our present invention is to provide such an apparatus which is effective in applying to a plate or board a foil without folds or trapped air pockets.

SUMMARY OF THE INVENTION

An apparatus for depositing a foil on a plate or board comprises, according to our present invention, a support table on a frame or base for holding the plate, a clamping bar extending parallel to the plate and shiftably mounted on the frame for reciprocation perpendicular to the plate, and a pair of elongate hollow bodies juxtaposable to the plate on a side thereof facing the clamping bar. The bar is engageable with the plate along a line spaced from the edges of the plate while the hollow bodies extend parallel to the bar and are shiftably mounted on the frame for reciprocation in a direction parallel to the plate and substantially perpendicular to the contact line. Each body has a plurality of apertures.

A transfer device is provided on the frame for conveying the foil, prior to a deposition thereof on the plate, into a space between the same and the bar and for coacting with the bar to place at least part of the foil on the plate. A suction pump is connected to the hollow bodies for producing a vacuum therein, while a drive is operatively linked to the bar for shifting the same downwardly to clamp the foil to the plate along the contact line upon conveyance of the foil into the aforementioned space. The drive moves the suction bodies outwardly across the plate from respective initial positions proximate to the contact line upon the clamping of the foil to the plate.

According to further features of our present invention, the suction bodies are each provided with a multiplicity of apertures distributed along the length of the respective body and these bodies are in the form of hollow wedges with vertex edges facing one another across the cotact line, the wedges each having a flat side engageable with the plate. Preferably, the apertures are disposed in linear arrays along the vertex of each wedge.

According to another feature of our present invention, each wedge is provided with a support in the form of a textile web attached at one end to the respective wedge and withdrawable therewith from a space between the foil and the plate, the web serving to hold a portion of the foil upon a withdrawal stroke of the respective wedge. Deposition means are provided for placing the plate on the support.

Pursuant to another feature of our present invention, a method for applying a foil to a plate comprises the steps of: (a) juxtaposing to the plate a pair of parallel elongate suction members, (b) clamping the foil to the plate between the suction members along a line parallel thereto, and (c) drawing the suction members perpendicularly away from the line and parallel to the plate.

An apparatus operating according to this method can apply, without folds and air pockets, a very thin foil to a surface of a plate or board, even the edges of the foil being flush with the plate surface.

BRIEF DESCRIPTION OF THE DRAWING

These and other features of our present invention will now be described in detail, reference being made to the accompanying drawing in which.

SPECIFIC DESCRIPTION

Figure 1:
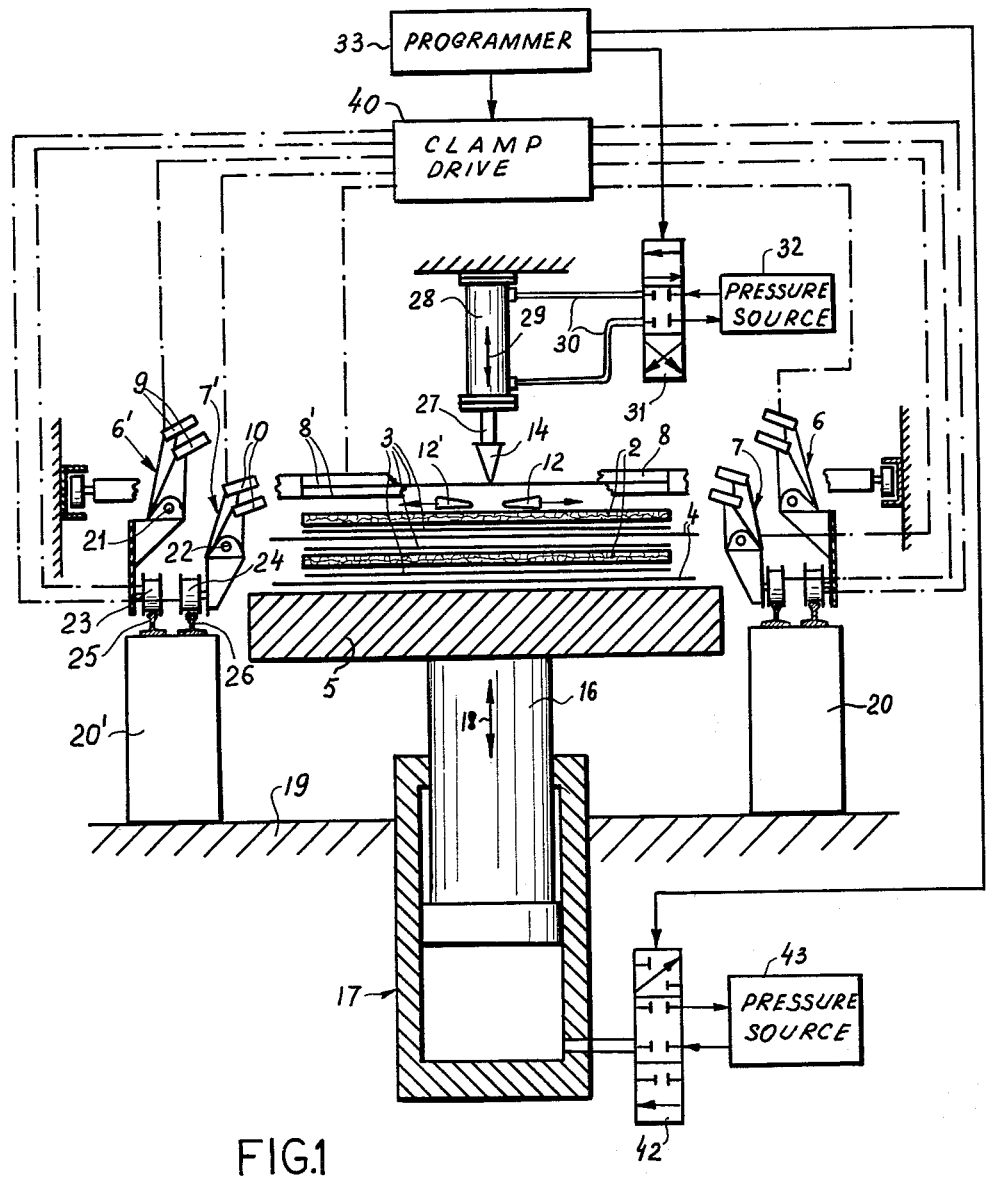
FIG. 1 is a partially schematic and partially cross-sectional side view of a lamination-layer stacking assembly including an apparatus according to our present invention for applying a foil to a plate.

Juxtaposed with or incorporated in a laminating station at which metal-foil sections 3 and resin-impregnated boards 2 interleaved with pressure plates 4 are compressed to form a plurality of laminations to be used, for example, in the production of printed circuits is a stacking station 1 at which is disposed a support table or platform 5 mounted on the plunger 16 of a hydraulic cylinder 17 for vertical reciprocation, as indicated by a double-headed arrow 18 in FIG. 1. The hydraulic cylinder is imbedded in a base or foundation 19 which also carries a pair of piers 20 and 20' supporting respective pairs of grippers 6, 7, and 6', 7', grippers 6 and 6' coacting to deposit pressure plates 4 on support 5 and grippers 7 and 7' coacting to place boards or base plates 2 on the support.

Figure 4:
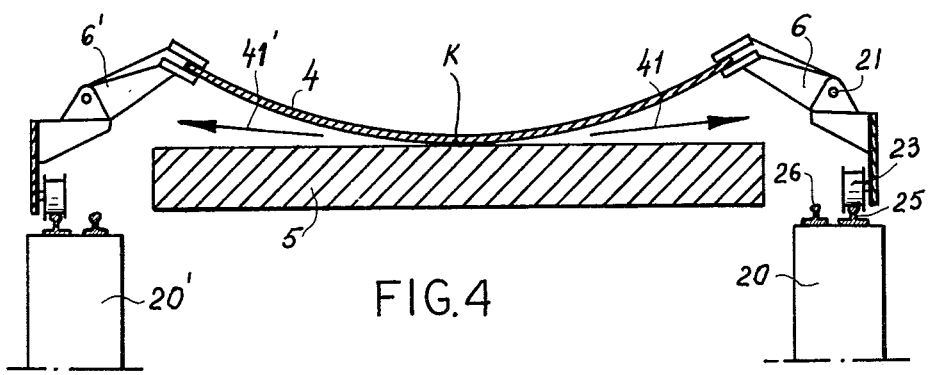
FIG. 4 is a schematic side view of part of the lamination-layer stacking assembly of FIG. 1, showing a stage in the operation thereof.

The grippers 6, 6' and 7, 7' comprise respective clamping bars 9 and 10 hinged at pivots 21 and 22 to function as tongs or jaws for grasping boards 2 or pressure plates 4 at opposite ends thereof (see FIG. 4). The grippers 6, 6' and 7, 7' are mounted on carriages represented in FIG. 1 by wheels 23 and 24, the carriages being carried on respective rails 25 and 26 extending from feed stations (not shown) to stacking station 1.

An apparatus at stacking station 1 for depositing the metal-foil sections 3 on base boards 2 or on pressure plates 4 comprises according to our present invention a gripper assembly 8 for clamping a foil section 3 at opposite ends thereof, for transporting the foil to the stacking station and for holding the foil during at least an initial phase of a deposition operation. The deposition apparatus according to our present invention further comprises a clamping bar 14 extending parallel to support 5 and connected to the plunger 27 of a pneumatic cylinder 28 for reciprocating in a direction perpendicular to support 5, as indicated by a double-headed arrow 29. Cylinder 28 is connected via a pair of air hoses 30 and an electromagnetic valve 31 to a source 32 of pressurized air, the valve being controlled by a programmer 33.

Figure 2:
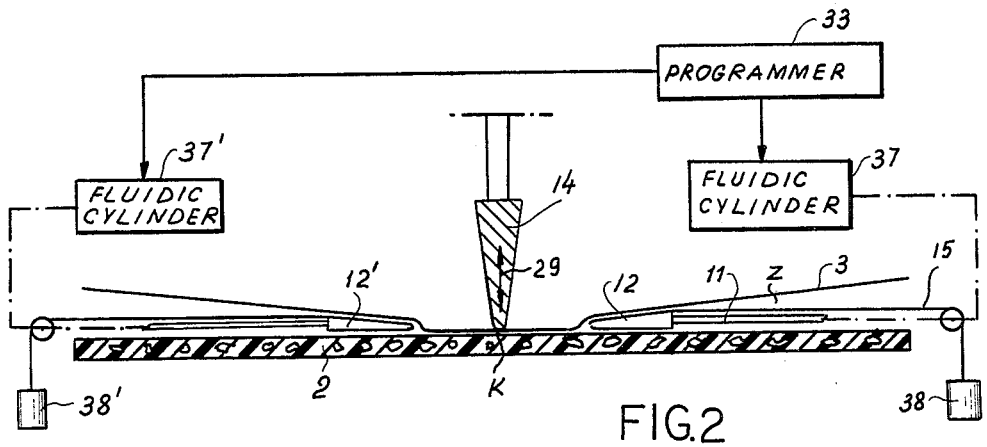
FIG. 2 is a detail view from FIG. 1, showing a stage in the operation of a foil-applying apparatus according to our present invention.
Figure 3:
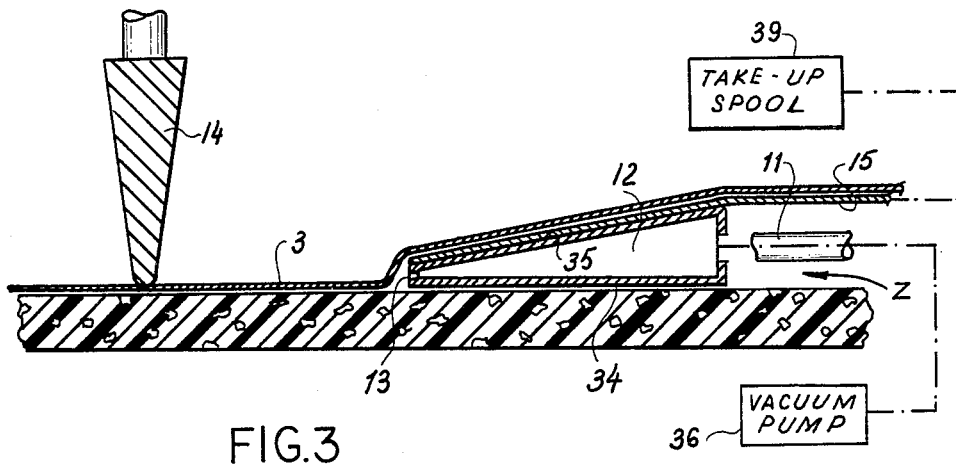
FIG. 3 is a detail view from FIG. 2.

The deposition apparatus according to our present invention also includes a pair of elongate hollow wedges 12, 12' (see FIGS. 2 and 3) extending parallel to bar 14 and having vertices provided with a linear array of apertures 13, as indicated in FIG. 3. Each wedge 12, 12' has a surface 34 engageable with a base board 2 or a pressure plate 4 and another surface 35 to which a textile web 15 is attached for supporting a portion of metal foil 3 upon a withdrawal stroke of the respective wedge. Wedges 12, 12' are connected to a suction or vacuum pump 36 and to drive devices such as fluidic cylinders 37, 37' and pulley-guided weights 38, 38', while the textile web 15 extend from respective uptake spools or rolls 39.

As schematically illustrated in FIG. 1, programmer 33 is connected to a drive mechanism 40 for actuating pressure-plate grippers 6, base-board grippers 7 and foil grippers 8 at successive instants in a predetermined operating program. At the beginning of an operating cycle, for example, drive 40 may move the carriages of grippers 6 and 6' along tracks or rails 25 in order to convey a pressure plate 4 from a feed station to stacking station 1. Upon the reaching of this station by grippers 6 and 6', programmer 33 induces drive 40 to swing the tongs or grippers about axes 21, thereby enabling a downwardly convex bending of the pressure plate and a consequent engagement between the plate and support 5 along a center line K, as shown in FIG. 4. Upon a subsequent release of the ends of the pressure plate 4 by the grippers 6 and 6' in response to a command from programmer 33, the uplifted portions of the pressure plate 4 fall toward support 5 and push air outwardly from the spaces between the plate and the support, as indicated by arrows 41 and 41'.

Programmer 33 then commands drive 40 to actuate foil-gripper and-transport members 8 and 8'. These members convey a foil section 3 in an open state into a space between the raised clamping bar 14 and the pressure plate 4 deposited on platform 5. Fluidic cylinders 37 and 37' are also controlled by programmer 33 (FIG. 2) to shift suction wedges 12 and 12' into respective initial positions flanking center line K (see FIG. 1). Upon a positioning of the wedges and of the foil, programmer 33 emits to electromagnetic valve 31 an energizing signal causing the extension of plunger 27, whereby the foil section is subsequently clamped to the pressure plate along center line K, as illustrated in FIG. 2.

Grippers 8 and 8' may then be actuated by programmer 33 via drive mechanism 40 to release the ends of the foil section 3, whereupon the two uplifted portions thereof fall or float down onto textile webs 15 (see FIG. 3), and cylinders 37 and 37' may be depressurized, whereupon weights 38 and 38' pull wedges 12 and 12' from the spaces Z between the foil portions and the underlying pressure plate.

Upon the complete withdrawal of the suction wedges from spaces Z, programmer 33 emits a signal to drive 40 for inducing the same to shift grippers 7 and 7' along tracks 26, whereby a base board 2 is conveyed to stacking station 1. This base board is placed upon the deposited metal foil by the heretofore-described procedure for placing a pressure plate (FIG. 4).

As shown in FIG. 1, hydraulic cylinder 17 is connected via an electromagnetic valve 42 to a source 43 of hydrostatic pressure. Programmer 33 is connected to valve 42 for raising support platform 5 prior to the deposition of a first pressure plate thereonto and for periodically lowering the platform during the formation of a stack of base boards 2, foil sections 3 and pressure plates 4.

We claim:

1. In a device for assembling a stack of pressed material including a synthetic resin impregnated mat, a press plate and a metal foil, in the formation of laminated board, wherein a cyclically displaceable assembly table is provided, means cooperates with said table for depositing the press plate thereon, means cooperates with the table to deposit said mat upon said press plate, and means cooperates with said table to apply said foil to said mat so that a foil layer is applied to one side of said mat, each of said means operating cyclically in production of pressed board, the improvement which comprises the combination therewith of:

a pair of suction boxes displaceable parallel to the table and having rows of suction openings turned toward each other; and a bar extending transversely of the direction of displacement of said suction boxes and displaceable relative to said table to press said foil against a surface whereby mutual displacement of said suction boxes away from said bar and from each other applies suction to said foil drawing same against said surface.

2. An apparatus for depositing a foil on a plate, comprising:

a frame;

support means on said frame for holding said plate;

a clamping bar extending parallel to said plate and shiftably mounted on said frame for reciprocation perpendicular to said plate, said bar beng engageable with said plate along a line spaced from edges of said plate;

a pair of elongate hollow bodies justaposeable to said plate on a side thereof facing said bar, said bodies extending parallel to said bar and being shiftably mounted on said frame for reciprocation in a direction parallel to said plate and substantially perpendicular to said line, said bodies each being provided with a plurality of apertures;

transfer means on said frame for conveying said foil prior to a deposition thereof on said plate into a space between same and said bar and for coacting with said bar to place at least part of said foil on said plate whereby said bodies are disposed between said foil and said plate;

suction-pump means connected to said bodies for producing a vacuum therein; and drive means operatively connected to said bar for shifting same downwardly to clamp said foil to said plate along said line upon conveyance of said foil into said space, said drive means being operatively connected to said bodies for moving same outwardly across said plate from respective initial positions proximate to said line upon clamping of said foil to said plate, said bodies being each provided with a multiplicity of apertures distributed along the length of the respective body and opening toward a region of the foil lying against said plate.

3. The apparatus defined in claim 2 wherein said bodies are in the form of hollow wedges with vertex edges facing one another across said line, said wedges having flat sides engageable with said plate.

4. The apparatus defined in claim 3 wherein each wedge has a multiplicity of apertures disposed in a linear array along the vertex of the wedge.

5. The apparatus defined in claim 4 wherein each wedge is provided with holder means for supporting a portion of said foil upon a withdrawal stroke of the respective wedge.

6. The apparatus defined in claim 5 wherein said holder means is in the form of a textile web attached to the respective wedge and withdrawable therewith from a space between said foil and said plate.

7. The apparatus defined in claim 6, further comprising first deposition means on said frame for placing said plate on said support means and second deposition means on said frame for placing a pressure plate on said foil upon deposition thereof on said plate.

8. A method for applying a foil to a plate comprising the steps of:

juxtaposing to said plate entirely between the foil and the plate a pair of parallel elongate suction members;

clamping said foil to said plate between said members along a line parallel thereto; and drawing said members perpendicularly away from said line and parallel to said plate while the members apply suction to the foil to smoothly draw the foil onto the plate.

* * * * *